April 21, 1953 G. N. HEIN, JR 2,635,602
HYPODERMIC INJECTION APPARATUS
Filed Nov. 21, 1951 2 SHEETS—SHEET 2
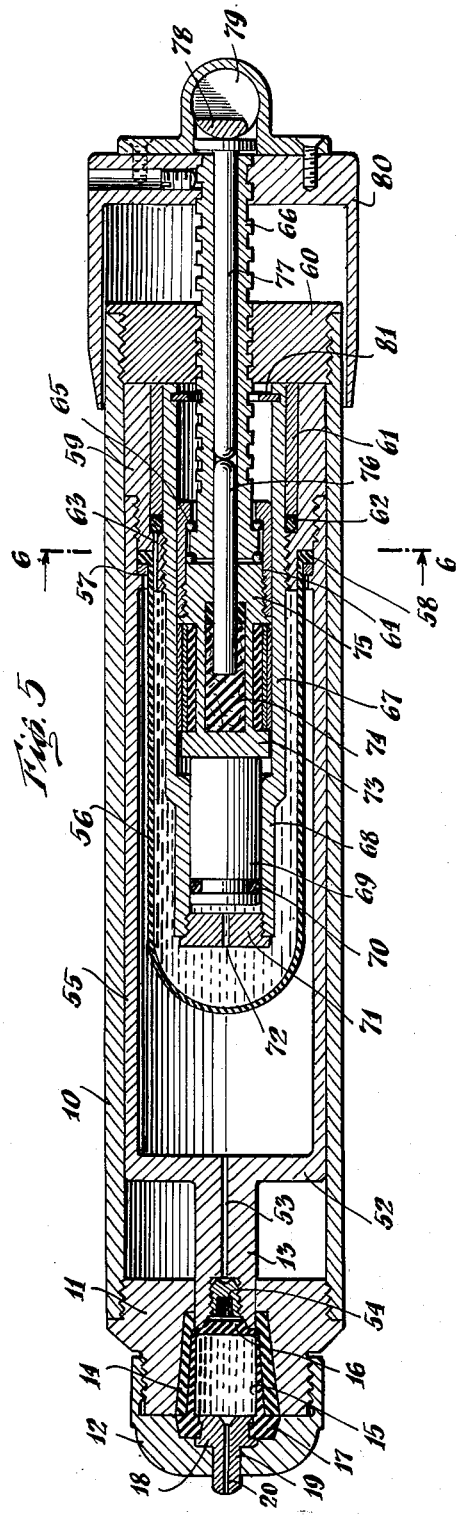
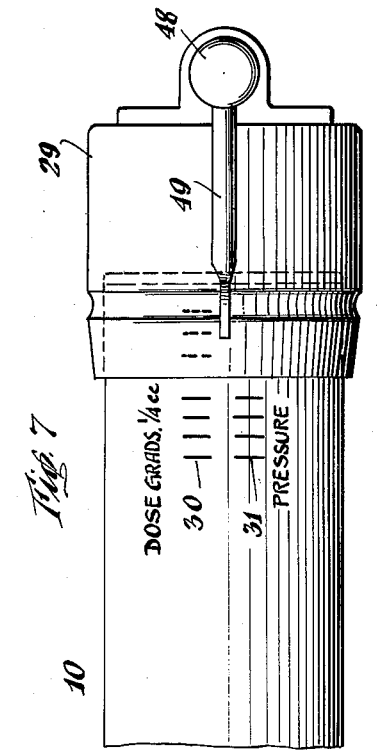
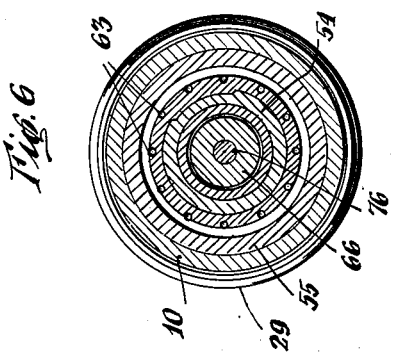
INVENTOR.
George N. Hein, Jr.
BY
Duell and Kane
ATTORNEYS Patented Apr. 21, 1953

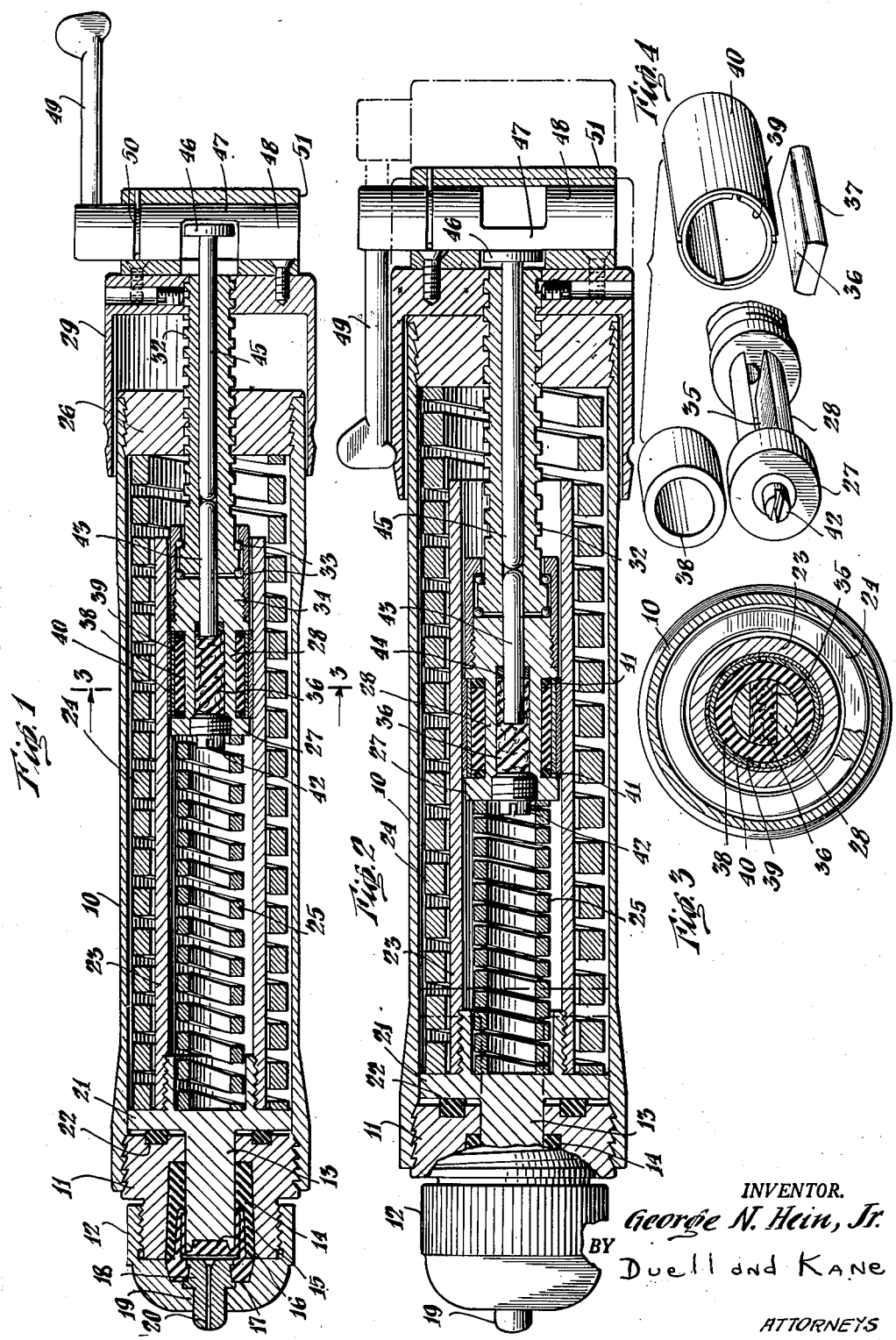

2,635,602

UNITED STATES PATENT OFFICE 2,635,602

HYPODERMIC INJECTION APPARATUS

George N. Hein, Jr., San Carlos, Calif.

Application November 21, 1951, Serial No. 257,568

15 Claims. (Cl. 128—173)

This invention relates to a structurally and functionally improved injection apparatus and aims to primarily provide an assembly by means of which medicament may be hypodermically injected without the aid of a skin-piercing needle.

It is an object of the invention to furnish an injection apparatus the parts of which may be readily cocked; only minimum physical effort being required in this connection.

A further object is that of furnishing a mechanism of this type which may be operated to furnish different injection pressures resulting in different depth of injection of the medicament. Moreover, by following the present teachings the volume of the injected dosage may be varied as desired.

An additional object is that of providing an assembly including relatively few parts each individually simple and rugged in structure which parts are capable of assemblage to furnish a unitary apparatus functioning over long periods of time with freedom from all difficulties.

With these and other objects in mind reference is had to the attached sheets of drawings illustrating practical embodiments of the invention and in which:

Fig. 1 is a sectional side view of the apparatus and showing its parts in one position;

Fig. 2 is a similar view but showing these parts shifted to a different position;

Fig. 3 is a transverse sectional view taken along the line 3—3 and in the direction of the arrows as indicated in Fig. 1;

Fig. 4 is a perspective view of the assembly constituting a preferred form of lock embodied in the present apparatus;

Fig. 5 shows an injecting device embodying a structure different from that disclosed in the earlier figures but in which the same functional results are achieved;

Fig. 6 is a transverse sectional view taken along the line 6—6 and in the direction of the arrows as indicated in Fig. 5; and Fig. 7 is a fragmentary side elevation of a unit embodying the foregoing structures.

Referring especially to Figs. 1 and 5, the numeral 10 indicates the main casing of the device which is preferably in the form of a tube and has affixed to its forward or outer end an extension or nose piece 11; the connection between these parts being preferably established by screw threads. The extension 11 in turn mounts adjacent its forward end a centrally apertured loading cap 12. This mounting is conveniently achieved by screw threads or in any other desired manner such that a quick-detachable coupling is furnished. The extension 11 and cap 12 define a medicament chamber. Preferably the latter receives medicament contained in a suitable ampule or cartridge. While this element may take numerous different forms it conveniently may embrace the structure illustrated especially in the figures referred to.

Thus, in these views merely the nose piece 11 is provided with a liner 14 of material such as rubber. The bore defined by this liner may be flared in an outward direction and receive an invertible cup 15 again conveniently formed of rubber. This cup has its inner end portion closed by a preferably thickened base 16 and has its outer open end defined by an inwardly extending flange 17. The latter may extend within a peripheral groove formed in the base portion 18 of a nozzle 19 to thus secure these parts against accidental detachment. At the same time they may be separated for purposes of cleaning and filling the ampule 15 and may also be separately sterilized. The nozzle 19 is provided with an axially extending bore continued from the inner face of its base 18 through to its outer end. At the latter point at least, it is preferred that its passage be restricted to define a relatively minute orifice. Conveniently that orifice may be on the order of .003" to .012"; it having been found that liquid streams of this diameter when projected with sufficient velocity will penetrate the epidermis and lodge in tissues underlying the same.

Plunger 13 is power projected by means of a pressure accumulator. That accumulator in the structure shown in Figs. 1 and 2 embraces an assembly of springs. It will be noted that in those views plunger 13 is provided with a base portion 21 which is conveniently integral with it. The inner face of extension or nose piece 11 may mount a cushion ring 22 to prevent damaging contact occurring between this base portion and the nose piece and to also limit the projection of plunger 13. A tube 23 is conveniently disposed within the bore of casing 10. Interposed between the casing and tube is a spring 24. A cap 26 may be secured to the inner end of tube 10 and against which the rear end of spring 24 bears. The rear end of spring 25 bears against the head of 27 of a spool 28 extending into the bore of tube 23.

A cocking sleeve 29 is disposed adjacent the rear end of the apparatus and has a diameter such that it may be telescoped around the same. Conveniently its edge portion may register with indicia 30 and 31 as shown in Fig. 7. The former indicia may be designative of the volume of the dosage and fractions of that complete volume while indicia 31 may indicate the pressures under which the medicament will be expelled. As shown especially in Figs. 1 and 2, sleeve 29 has secured to it a forwardly extending threaded shaft or rod 32. The latter terminates in a part forming a portion of an anti-friction bearing assembly 33. In turn disposed beyond that assembly is a head portion 34 which may conveniently be integral with the spool shank or the body 28. The threads of shaft 32 engaging with the threads of the opening in cap 26 through which it extends, it is apparent that as sleeve 29 is rotated shaft will be axially shifted carrying with it the sleeve. Also it will serve to shift the bearing assembly 33 and the head 34 as well as the spool body 28.

A lock structure forms a part of and is associated with the assembly of the spool. As especially shown in Fig. 4 the shank 28 is slotted as of 35. Disposed within that slot and having a width initially equal to the diameter of shank 28 is a block of rubber 36. The edges 37 of this block may be rounded in the form of arcs providing continuations of the arcuate outer surfaces of the spool. The height of block 36 may be such that it substantially fills slot 35. It is preferably formed of soft rubber. Encircling the shank 28 of the spool and engaged by the edges 37 of block 36 is a sleeve 38 also preferably formed of soft rubber. Enclosing sleeve 38 are a pair of arcuate brake shoe assemblies. The first of these indicated at 39 may include semicircular sections of metal and the outer assembly 40 may likewise include such sections. The edges of the two assemblies as shown are preferably displaced by substantially 90°. Interposed between sleeve 38 and the head portions 27 and 34 of the spool are ring-shaped washers 41. These may be formed of any desired material in order to prevent any extrusion of the material of sleeve 38. The head 27 of the spool may be formed with a centrally threaded aperture and receive a plug 42 bearing against block 36 to permit of adjustment.

As will be noted from Fig. 1 the parts of this lock structure or assembly are so proportioned that both block 36 and sleeve 38 may in their initial position be slightly clear of washers 41. Plug 42 will permit of adjustment of the parts in order to displace the material of block 36 to a greater or lesser extent. Such displacement will of course effect similar displacement on the part of sleeve 38. For ready operation in this connection a plunger 43 extends through a bore formed in head 34 and may be slidably engaged by a washer portion 44 corresponding to washer 41. The bore of head 34 may be in axial alignment with a similar bore formed in threaded rod or shaft 32. Within the latter a plunger 45 is disposed which has its end abutting plunger 43. The opposite or outer end of plunger 45 conveniently terminates in a head portion 46 which is engaged by a cam 47 forming a part of a rotatable shaft 48. The latter has extending from it a lever or crank portion 49 and is formed with a groove 50 into which there may extend a key carried by an extension 51 ensleeving the major portion of the shaft 48 and secured against movement with respect to sleeve 29.

It is apparent that with the parts disposed in the positions shown in Fig. 1, tube 23 may be axially shifted with respect to the lock assembly subject only to overcoming the compression exerted by springs 24 and 25. However, when lever or crank 49 is shifted from the position shown in Fig. 1 to that shown in Fig. 2 the cam portion of shaft 48 will be moved inwardly. With such inward movement it will thrust against head 46 to cause plunger 45 to be correspondingly shifted and to therefore shift plunger 43. That plunger will now enter the space defined by spool shank 28 and displace the material of block 36. With such displacement the voids in slot 35 will be filled and the edges 37 of the block will bear against sleeve 38 to displace the material of the latter and to cause an expansion of the assemblies 39 and 40. The outer face of the latter will therefore be forced into intimate contact with the bore of tube 23, thus preventing any movement of that bore with respect to the lock. As will be understood a return shifting of crank or lever 49 will cause the aforementioned displacement to be relieved, again allowing the tube to be shifted with respect to the lock. While not shown a "safety" or other expedient may be provided to prevent an accidental turning of shaft 48.

Considering the operation of the apparatus as shown in Figs. 1 to 4, it will be understood that the parts are initially in the position shown in Fig. 1. In those positions if sleeve 29 is rotated in a clockwise direction shaft 32 will be projected and thus project sleeve 28 and its head portion 27. Incident to the engagement of the latter with the inner end of spring 25, that spring will be compressed. Such compression may be continued up to the limit of movement of the parts. When the desired degree of compression has been achieved the lock is operated by swinging lever 49 so as to prevent a movement between its assembly and tube 23. Sleeve 29 is now rotated in a counter-clockwise direction. With such rotation shaft 32 will serve to draw the entire tube 23 and base portion 21 to the right as viewed in Fig. 1. The position of the parts at the initial stage of this stroke has been shown in Fig. 2. In any event if sleeve 29 is retracted to its fullest extent then plunger 13 will be similarly retracted. Loading cap 12 may be dismounted and a spent ampule within the medicament chamber discarded. A fresh ampule may be introduced into that chamber and the loading cap reapplied.

If now the site of injection has been determined the end of nozzle 19 may be brought to a position in contact with or adjacent the epidermis overlying that site. Thereupon the operator may shift lever 49 from the position shown in Fig. 2 to that illustrated in Fig. 1. With such shifting the lock will be released and under the force exerted by both springs 24 and 25 plunger or stem 13 will be projected to project the base 16 of the ampule and cause the latter to invert upon itself. Therefore the medicament within the ampule will be ejected through orifice 20 at high velocity and pressure and in a fine stream. So ejected it will penetrate the skin and lodge in the tissues underlying the same. Of course, during the cocking of the device and the projection of the spool with respect to tube 23, it will not be necessary to shift sleeve 29 inwardly to the limit of its movement. Under these circumstances only part of the pressure capable of being developed by spring 25 is exerted on the discharge or firing stroke. Should less than the complete dosage within the ampule be desired for injection purposes, then after the sleeve 29 has been retracted (moved counter-clockwise) to its fullest extent and the fresh ampule introduced into the medicament chamber, that sleeve may be turned in a clockwise direction prior to firing. With such turning it is apparent that stem or plunger 13 will be advanced in order to discharge any undesired portion of the medicament from the ampule. An operator will be able to determine the value of the pressures which will be exerted and the amount of the dose by consulting the registration afforded by means of the indicia 30 and 31 in cooperation with the edge of sleeve 29.

Precisely the same results may be achieved in the case of an injection apparatus utilizing a pressure accumulator having a structure different from that heretofore described. Such an accumulator in association with an injection apparatus has been illustrated in Figs. 5 and 6. In those views it will be noted that the base of the stem or plunger 13 is connected to or integral with an end wall 52. The stem 13 is provided with a passage 53 normally closed by plug 54. End wall 52 conveniently forms a part of the forward portion of a tube 55 slidably mounted within casing 10. An expansible member in the nature of a diaphragm 56 is also disposed within the assembly and to extend into the bore of tube 55. This expansible member may take the form of a tube of any suitable material such as rubber and which has its forward end closed. Its rear end is disposed adjacent a retaining ring 57 and terminates in an outwardly extending flange 58. That flange 58 is clamped between the washer or ring 57 and the forward end of a collar 59 secured by screw threads to the rear end of tube 55 in order to move with the latter.

A cap 60 closes the rear end of casing 10. Secured to this cap or else merely bearing against the same is a sleeve 61 which slidably extends into the bore of collar 59. Adjacent the forward end of this sleeve a packing is disposed which may be in the form of an O ring 62. That ring rides within the space enclosed by collar 59 and is disposed in line with ports or passages 63 which are formed in the forward end of collar 59. A bearing assembly embraces a confining or cage member 64 enclosing antifriction bearings 65. The latter engage the surfaces of the forward end of a screw-threaded shaft or rod 66 corresponding to the shaft 32 as described in connection with the earlier figures. A tube 67 is disposed within the bore of expansible member 56. This tube has a forward end 68 defining a cylinder within which a piston 69 rides. That piston preferably has associated with it a packing 70 in the form of an O ring. The outer or forward end of the cylinder is closed by plug 71 provided with a passage 72.

A head portion 73 bears against the rear end of piston 69. This portion forms a part of a spool as identified under numerals 27, 28 and 34 in the earlier figures. A lock assembly 74 is associated with the spool in the manner similar to that heretofore described and also in such a manner the spool terminates in a rear head portion 75.

That portion is formed with a bore as is also the shaft 66. These bores as shown are aligned and plungers 76 and 77 are disposed therein with the former plunger cooperating with the parts of the lock assembly, while the latter plunger terminates in a head portion cooperating with a cam 78. This forms a part of a shaft 79 which is lever actuated in a manner hereinbefore described and the shaft is rotatably supported by a cocking sleeve 80 which is secured against movement with respect to shaft 66.

In operating the device as shown in Figs. 5 and 6 it will be assumed for the purpose of traversing one cycle that the stem or plunger 13 is in projected position such as has been shown in Fig. 1 of these drawings. In other words the device has been fired and wall 52 is adjacent the rear face of nose piece 11. Under these circumstances an operator will rotate the cocking sleeve 80 in a clockwise direction with the lock assembly 74 in released condition. Such rotation will of course cause the threads of shaft 66 to cooperate with the threads formed in the opening through cap 60 in order to shift that shaft to the left as viewed in Fig. 5. Consequently the entire lock assembly will be correspondingly shifted and head 73 will bear against piston 69 to project the same through cylinder 68. With that projection fluid (which may be in the form of a grease or oil) will be projected through passage 72 into the interior of diaphragm member 56. Therefore the latter will be expanded into the space defined by tube 55. The interior of that tube being filled with a gas under pressure (such as nitrogen at, for example, 1,500 pounds) it follows that the expansion of member 56 will cause a diminution in the space within tube 55 and a consequent increase in pressure of the gas therein. If it is desired to provide for a full pressure stroke then the parts will assume the position shown in Fig. 5. Thereafter shaft 79 is rotated in order to shift cam 78 and project plungers 77 and 76 to render the lock structure operative so that the parts associated therewith will be prevented from moving with respect to tube 67. With the parts so shifted cocking sleeve 80 is rotated in a counter-clockwise direction. This will cause shaft 66 to retract the parts including tube 67, sleeve 59 connected therewith and tube 55 coupled to that sleeve. During this movement of the parts sleeve 61 will remain stationary. Accordingly, it will function as a piston moving within the space intervening collar 59 and tube 67 and expel liquid through the passages 63 into the interior of the expansible member 56. This will further increase pressures.

Loading cap 12 may now be dismounted from extension or nose piece 11. The spent ampule within the medicament chamber may be removed. A fresh ampule may be substituted thereof. If it is desired not to discharge the full contents of the ampule then part of the medicament may be expelled by again rotating cocking sleeve 80 in a clockwise direction to achieve the desired results. The amount of medicament remaining will be indicated by the indicia 30. Likewise if full pressures are not desired and shaft 66 is only partially projected the value of the pressures will be indicated by the indicia 31. In any event with the site of injection determined it is apparent that by bringing nozzle to a position overlying the desired area of the epidermis, an operator may shift cam 78 by rotating shaft 79. With such shifting the parts of the lock assembly 74 will be released. This will permit relative movements of tube 67 and the mechanisms contained therein. The pressure of the gas will act against the inner face of end wall 52 and against the surfaces of the expansible member 56. Therefore with the parts released, that member or diaphragm will be collapsed to cause a return movement of the liquid through passages 72 and 63. Under these circumstances tube 55 will be projected to correspondingly project plunger 13 and expel medicament in the desired manner. A stop conveniently in the form of a ring 81 may be carried by the rear end of tube 67 and be engaged by the housing of the bearing assembly 64. This will prevent the operator from inadvertently allowing piston 69 to retract to an extent such that it dislodges from cylinder 68.

Thus among others the several objects of the invention as specifically aforenoted are achieved. Obviously numerous changes in construction and re-arrangements of the parts might be resorted to without departing from the spirit of the invention as defined by the claims.

I claim:

1. A hypodermic injection apparatus including in combination a hollow body presenting a medicament chamber adjacent one of its ends, means projectible within said body for expelling medicament from said chamber, a pressure accumulator acting to forcibly project said expelling means, manually operable means mounted by said body and movable in one manner to increase the pressure exerted by said accumulator, means whereby a movement of said manual means in another direction will further increase the accumulator pressure and releasable locking means for preventing a movement of said expelling means.

2. An injection apparatus including in combination a casing, means furnishing a mounting for a medicament-containing ampule adjacent one end thereof, a plunger mounted by said casing for projection towards said ampule to expel its medicament, a pressure accumulator within said casing, said accumulator including a pair of mechanisms both acting to forcibly project said plunger and means for separately potentializing said mechanisms.

3. An injection apparatus including in combination a casing, means furnishing a mounting for a medicament-containing ampule adjacent one end thereof, a plunger mounted by said casing for projection towards said ampule to expel its medicament, a pressure accumulator within said casing, said accumulator including a pair of mechanisms both acting to forcibly project said plunger, means for potentializing one of said mechanisms, means for locking the same against release and means for potentializing the second of said mechanisms.

4. An injection apparatus including in combination a casing, means furnishing a mounting for a medicament-containing ampule adjacent one end thereof, a plunger mounted by said casing for projection towards said ampule to expel its medicament, a pressure accumulator within said casing, said accumulator including a pair of mechanisms both acting to forcibly project said plunger, means for potentializing one of said mechanisms, means for locking the same against release, means for potentializing the second of said mechanisms and a single manually operable member for causing a functioning of said potentializing means.

5. An injection apparatus including in combination a casing, means furnishing a mounting for a medicament-containing ampule adjacent one end thereof, a plunger mounted by said casing for projection towards said ampule to expel its medicament, a pressure accumulator within said casing, said accumulator including an enclosing member connected to move with said plunger and means engaging said member for locking the same and said plunger against projection.

6. An injection apparatus including in combination a casing, means furnishing a mounting for a medicament-containing ampule adjacent one end thereof, a plunger mounted by said casing for projection towards said ampule to expel its medicament, a pressure accumulator within said casing, said accumulator including an enclosing member connected to move with said plunger and means engaging said member and disposed within the bore of the same for locking said member and plunger against projection.

7. An injection apparatus including in combination a casing, means furnishing a mounting for a medicament-containing ampule adjacent one end thereof, a plunger mounted by said casing for projection towards said ampule to expel its medicament, a pressure accumulator within said casing, said accumulator including an enclosing member connected to said plunger and disposed within said casing, a spring interposed between said member and casing, a further spring disposed within said enclosing member, both of said springs being arranged to react against said plunger and casing respectively, means for compressing one of said springs and means for also compressing the second of the same.

8. An injection apparatus including in combination a casing, means furnishing a mounting for a medicament-containing ampule adjacent one end thereof, a plunger mounted by said casing for projection towards said ampule to expel its medicament, a pressure accumulator within said casing, said accumulator including an enclosing member connected to said plunger and disposed within said casing, a spring interposed between said member and casing, a further spring disposed within said enclosing member, both of said springs being arranged to react against said plunger and casing respectively, means for compressing one of said springs, means for also compressing the second of the same and lock means cooperable with said member for preventing a movement of said first spring with respect to the same after it has been compressed.

9. An injection apparatus including in combination a casing, means furnishing a mounting for a medicament-containing ampule adjacent one end thereof, a plunger mounted by said casing for projection towards said ampule to expel its medicament, a pressure accumulator within said casing, said accumulator including a tube connected to said casing and providing a cylinder, a piston projectible within said cylinder to expel liquid therefrom, a member connected to said plunger and defining a pressurized space, an expansible diaphragm receiving liquid discharged by said cylinder and a second piston and cylinder assembly also connected to discharge liquid within the space defined by said diaphragm upon said plunger being retracted.

10. An injection apparatus including in combination a casing, means furnishing a mounting for a medicament-containing ampule adjacent one end thereof, a plunger mounted by said casing for projection towards said ampule to expel its medicament, a pressure accumulator within said casing, said accumulator including a tube connected to said casing and providing a cylinder, a piston projectible within said cylinder to expel liquid therefrom, a member connected to said plunger and defining a pressurized space, an expansible diaphragm receiving liquid discharged by said cylinder, a second piston and cylinder assembly also connected to discharge liquid within the space defined by said diaphragm upon said plunger being retracted and a lock structure manually operable to cooperate with said tube and prevent a movement of the piston within the cylinder of the same.

11. An injection apparatus including in combination a casing, means furnishing a mounting for a medicament-containing ampule adjacent one end thereof, a plunger mounted by said casing for projection towards said ampule to expel its medicament, a pressure accumulator within said casing, said accumulator including an enclosing member connected to move with said plunger, a block of displaceable material disposed within the bore of said member and means for causing a displacement of said block to lock the same against movement with respect to said member to thus prevent the latter and said plunger from projecting.

12. An apparatus as specified in claim 11 including means for supporting said block within said member and against axial movement with respect to said casing.

13. An apparatus as specified in claim 11 in which said displacement-causing means comprises a member extending beyond said casing and movable with respect to the same and means operatively connected to said member and block to shift axially of said casing as said member is moved.

14. An apparatus as specified in claim 11 including means for supporting said block within said member whereby said block has surfaces moving in a radial direction, as said displacement means functions, said surfaces acting against the bore face of said member to lock the latter against movement with respect to said casing.

15. An apparatus as specified in claim 13 including expansible means interposed between said block surfaces and the member bore and means preventing a movement of said expansible means in a direction axially of said casing.

GEORGE N. HEIN, Jr.

No references cited.